R. A. THOM.
SIGHT FEED PRESSURE LUBRICATOR.
APPLICATION FILED MAY 31, 1916.

1,196,687.

Patented Aug. 29, 1916.
4 SHEETS—SHEET 1.

Inventor
Robert Absalom Thom,
By P. Sniger.
Atty.

R. A. THOM.
SIGHT FEED PRESSURE LUBRICATOR.
APPLICATION FILED MAY 31, 1916.
1,196,687.
Patented Aug. 29, 1916.
4 SHEETS—SHEET 2.
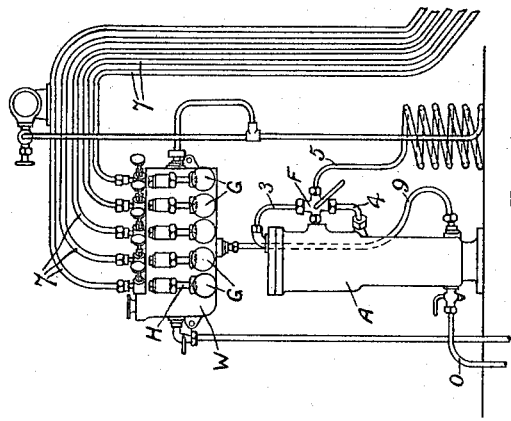
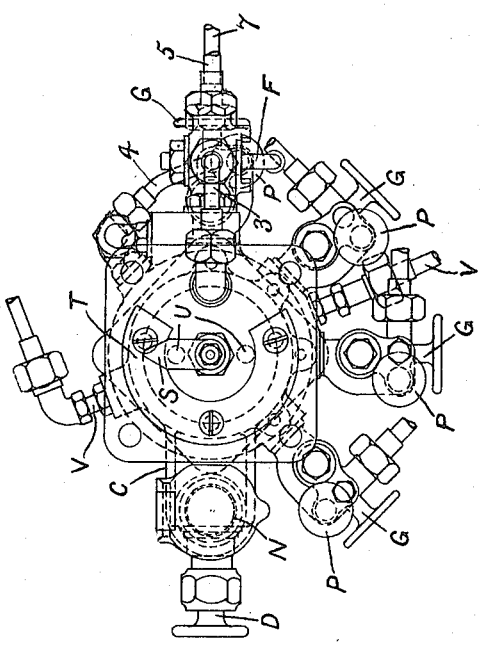
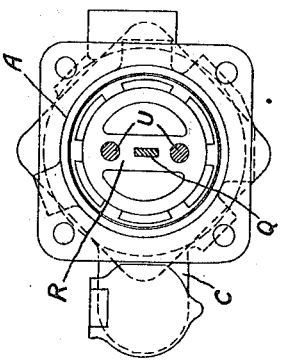

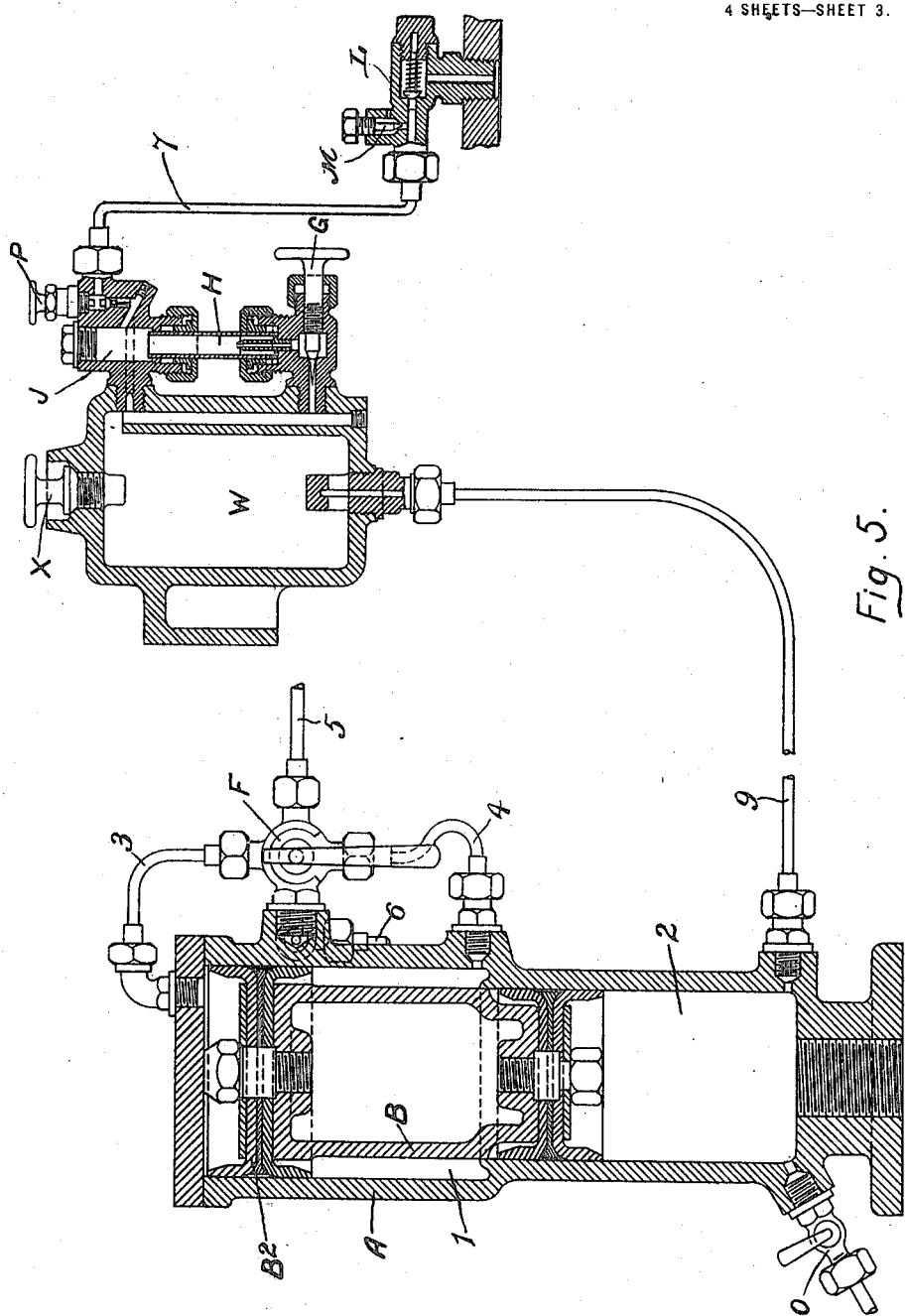

R. A. THOM.
SIGHT FEED PRESSURE LUBRICATOR.
APPLICATION FILED MAY 31, 1916.

1,196,687.

Patented Aug. 29, 1916.
4 SHEETS—SHEET 4.

UNITED STATES PATENT OFFICE.

ROBERT ABSALOM THOM, OF MANCHESTER, ENGLAND.

SIGHT-FEED PRESSURE-LUBRICATOR.

1,196,687.　　　　Specification of Letters Patent.　　Patented Aug. 29, 1916.

Application filed May 31, 1916.　Serial No. 100,956.

*To all whom it may concern:*

Be it known that I, ROBERT ABSALOM THOM, a subject of the King of Great Britain, and resident of Manchester, England, have invented certain new and useful Improvements in Sight-Feed Pressure-Lubricators, of which the following is a specification.

This invention relates to improvements in lubricators and has for its object to provide a lubricator for use on locomotive and other situations which will not depend for its action upon pumps or other mechanical devices and which will insure a constant and steady delivery of the lubricant to the part or parts to be lubricated at a desired pressure and in quantities which can be controlled and observed by the operator.

In the accompanying drawings I have illustrated practical embodiments of my invention particularly designed for use on locomotives, but it will be understood that I do not confine myself to these specific constructions which can be varied in many ways within the limits of my claims.

Figure 2:
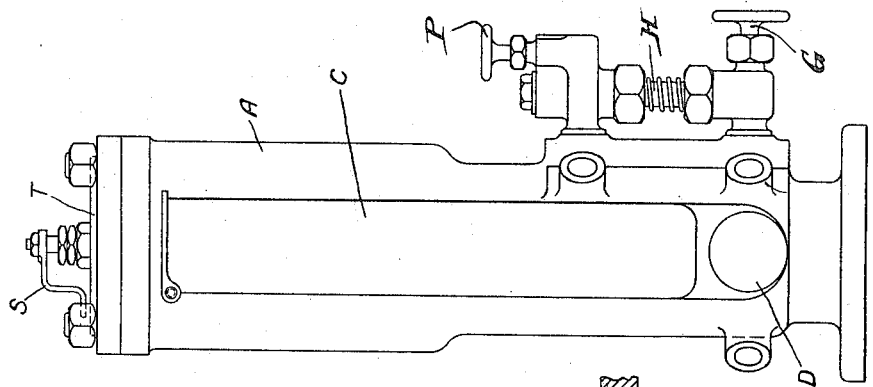
Figure 1:
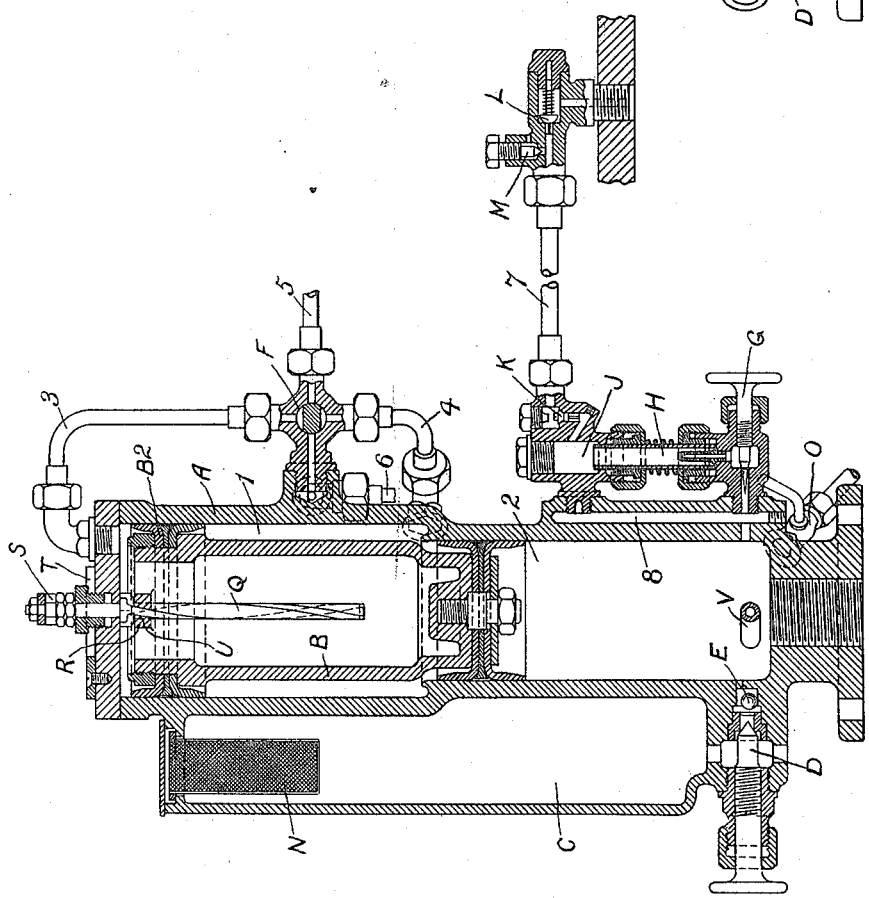
Figure 7:
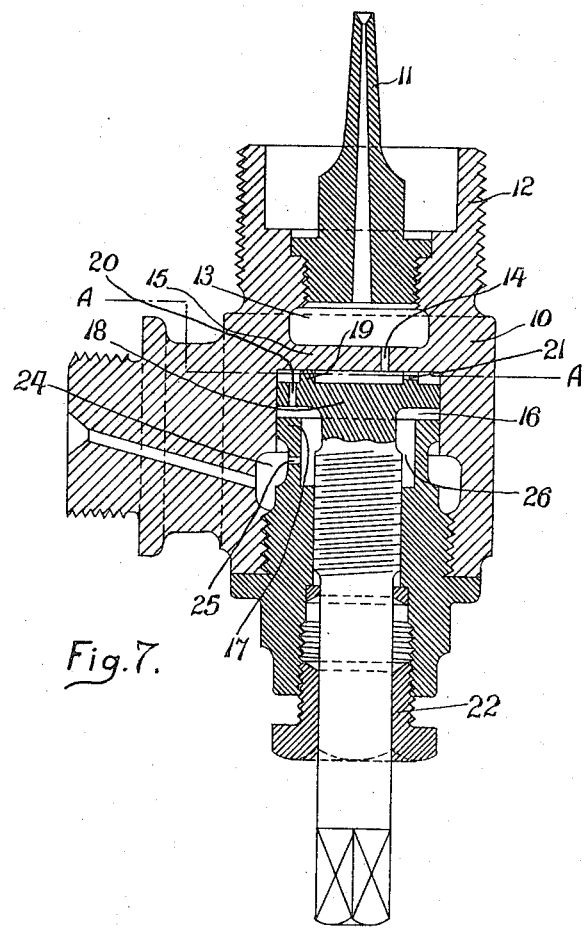
Figure 8:
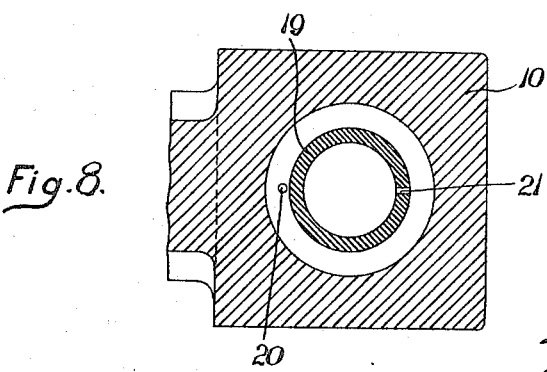

In these drawings Figure 1 is a sectional elevation and Fig. 2 a side elevation of one form of lubricator. Fig. 3 is a plan showing the oil feed and steam connections. Fig. 4 is a sectional plan showing the piston head. Fig. 5 is a sectional elevation showing a modified form of my lubricator. Fig. 6 is a diagrammatic view illustrating the practical application of the arrangement shown in Fig. 5 to a locomotive. Fig. 7 is a vertical section of a particular form of regulating valve, and Fig. 8 is a transverse section thereof on line A—A of Fig. 7.

Referring particularly to Figs. 1 to 4 A designates a cylinder having two diameters to form two chambers 1 and 2 respectively of which the larger 1 has a cross-sectional area of say about one and a half times that of the smaller chamber 2. A plunger B is fitted in the smaller chamber 2 and near its outer or upper extremity carries a piston $B^2$ suitably packed to fit the diameter of the larger chamber. The smaller chamber 2 is supplied with oil or other lubricant from a reservoir C communicating with it by a passage controlled by a regulating valve D and also fitted with a ball valve E, or a clack or other suitable form of non-return valve. The opposite ends of the larger chamber 1 are connected by pipes or passages 3 and 4 to a four way cock F which has a third branch 5 connected to the steam space of the boiler or other source of fluid pressure by a coil of pipe (not shown) which acts as a surface condenser to prevent overheating the lubricator or lubricant while the fourth branch 6 leads to the atmosphere. The ports in the plug of the four way cock F are so arranged, as clearly shown in Fig. 1, that fluid pressure can be admitted to either the top of the piston $B^2$ or to the annular space below it, while the other side of the plug opens the branch 6 to the atmosphere, or pressure can be shut off from both sides by simultaneously closing the branches 5 and 6 leading from the boiler and to the atmosphere respectively.

When the piston is subjected to the steam pressure from the boiler it is forced downward and so forces the plunger B down on the oil in the lubricating chamber 2 which will then be under a pressure approximately fifty per cent. greater than the boiler pressure, and, on opening a regulating valve G in the outlet from the lubricating chamber 2, oil will be delivered under this pressure through the sight feed glass H, passing in the form of a globule through the glass into a delivery chamber J whence it is forced out through a non-return valve K into a pipe or passage 7 leading to the cylinder, steam pipe, or steam chest to be lubricated. At or near the far end of this delivery pipe or passage 7 where the oil enters the place or part to be lubricated, is fitted a non-return valve L suitably spring-loaded to a pressure greater than that of the atmosphere to prevent oil being sucked out of the delivery pipe or passage 7 when steam is shut off. A test plug M is inserted, as shown in Fig. 1, in order to ascertain when the delivery pipe 7 is fully charged with lubricant. The oil is supplied to the reservoir C through a gauze or other suitable strainer N and the oil and leakage water can be drawn off as and when required through a drain cock O connected to the lubricating chamber 2.

To fill the lubricator and get it ready for work the reservoir valve D is opened and the four way cock F is actuated to admit steam pressure above the piston $B^2$ and drive the plunger B down to the bottom of its stroke. The regulating valve G on the delivery from the lubricating cylinder 2 is then closed, the oil reservoir C is filled with water and the four way cock F turned to admit steam to the annular space below the piston $B^2$, thereby causing the plunger B to rise to the top of its stroke drawing water out of the reservoir C into the lubricating chamber 2. The reservoir valve D is then closed, the delivery regulating valve G is opened, and the four way cock F is again actuated to cause the plunger to descend in the lubricating chamber 2, thus forcing out the water and filling the sight feed glass H and the delivery pipe or passage 7, the test plug M being opened to permit surplus water to escape. When the plunger B has reached the bottom of its stroke the delivery regulating valve is closed, the reservoir is filled with oil, the reservoir valve D opened, and the four way valve F turned to cause the plunger B to rise and fill the lubricating chamber 2 with oil from the reservoir C, and when the plunger B has reached the top of its stroke, the reservoir valve D is closed, the delivery regulating valve G opened, and the four way cock F actuated to reverse the movement of the plunger B. The oil will then be forced out of the lubricating chamber 2, passing in the form of globules up the sight feed glass H and be forced through the non-return valve K into the delivery pipe or passage 7. This action is allowed to continue until oil issues at the test plug M at the far end of the delivery pipe or passage 7. Then the delivery regulating valve G is closed and the test plug M screwed down, leaving the delivery pipe or passage 7 charged with oil and the lubricator under pressure and ready for work.

To start the lubricator it is necessary only to regulate the delivery by opening the regulating valve G sufficiently to deliver the required number of drops or globules, and to leave the four way cock F in position to force the plunger B constantly downward.

To simplify description I have mentioned only one delivery regulating valve G, sight feed glass H and connections but I wish it to be clearly understood that I propose to employ any suitable number such as four or even eight regulating valves and sight feed glasses, any or all of which may be in or out of action. In the plan view, Fig. 3, I show a lubricator having four regulating valves with sight feed glasses and connections all controlled and operated by one four way valve F and intensifier.

It will be obvious that the process of charging the delivery pipes or passages with oil is required only when the lubricator is first set to work. When empty the lubricating chamber 2 can be re-charged by simply operating the valves D and G and four way cock F.

The improved lubricator as above described is a true forced feed arrangement working with a constantly charged delivery pipe or passage 7 through a loaded delivery valve L close to the cylinder or other part to be lubricated. Equality of distribution is insured by the several sight glasses H. A broken glass can be quickly removed and a fresh glass substituted by shutting its respective delivery regulating valve G. Any blowing back is prevented by the two non-return valves K and L in its delivery pipe or passage. A by-pass 8 is provided leading from the lubricating chamber 2 to the space above the non-return valve K above the sight feed glass H, the supply of lubricant in this space being controlled by a hand operated valve P so as to cut out the sight glass H and enable the oil to be short circuited from the lubricating chamber 2 to the delivery pipe or passage 7, and thus enabling the engine driver to renew the glass at leisure.

For the purpose of indicating the quantity of oil contained in the lubricator I employ a spindle Q fitted in a steam tight gland in the cover of the lubricator body and free to rotate therein. A helix or Archimedean thread is formed on the spindle Q and this helical portion passes through a bridge or cross bar R fixed on the top of the plunger B so that as the plunger descends the spindle Q is rotated and a pointer S thereon moving over the surface of a graduated dial T indicates, by the position of the plunger B, the quantity of oil remaining in the lubricating chamber 2.

The rotation of the plunger B is prevented by pins U projecting from the cylinder cover and passing through holes in the bridge or cross bar R. To keep the lubricant fluid I prefer to employ a steam warming pipe V in the lubricating chamber 2.

Referring now to Fig. 5, which illustrates a modified form of my improved lubricator, it will be seen that I furnish means for the plunger B to act upon water or other suitable liquid instead of directly upon the oil or other lubricant and to force the water or other liquid from the pressure cylinder 2 through a pipe or passage 9 into a distributing chamber W containing the actual lubricant to be displaced and supplied to the part to be lubricated. A filling plug X is placed at the top of the distributing chamber W or in other convenient position to enable the chamber to be supplied with the lubricant.

The construction of the differential cylinders, containing the plunger B and piston $B^2$, is substantially as already described in relation to Figs. 1–4, except that the sight feed glasses H instead of being connected to the pressure cylinder A are now placed upon or in connection with the distributing chamber W.

The chief advantages of the arrangement illustrated by Fig. 5 are that by the use of an intermediate fluid the steam and water of condensation are kept from intermixing with the actual lubricant. Further, the disposal of the parts—particularly on a locomotive—is greatly facilitated as the distributing chamber W can be placed in the cab under the immediate observation of the engine driver, while the differential pressure cylinder A can be placed at any convenient distance and in any suitable position. If desired, instead of a single distributing chamber W, as shown in Fig. 6, any suitable number of such distributing chambers or boxes may be employed, each with its own sight feed glass H or glasses and connections.

It will be seen on reference to Fig. 6 that all the sight feed glasses can be arranged at a convenient position for inspection by the driver while the intensifying chamber can be located at any convenient place quite out of the way if desirable.

In Figs. 7 and 8 I have illustrated a particular form of regulating valve designed to insure regularity of feed irrespective of the variations in operating pressure. This valve consists of a casing 10 into which is secured an ordinary well known type of lubricant delivery nozzle 11. The upper portion 12 of the casing 10 is screwed to receive a gland nut for a sight feed glass. Immediately below the nozzle 11 is an oil receiving chamber 13 having a small hole 14 in the division wall 15, the underside of which is in communication with chamber 16. At the bottom of casing 10 there is introduced an annular valve seating 17 and in the chamber 16 is placed a disk valve 18 having on its upper surface a small annular projection 19, and immediately over the valve seating 17 there is a small hole 20 connecting the upper and lower surface of the valve. The annular projection 19 is cross cut in one or more places as for instance at 21, see particularly Fig. 9. The spindle of the disk valve 18 is retained steam tight by an ordinary stuffing box and gland box 22. The valve seating, being of annular form of an internal diameter larger than that of the valve spindle, leaves a space between it and the valve spindle, thus forming another lubricant containing chamber. The other screwed nipple of the casing 10 is connected to the main lubricant containing chamber by means of passage 23 which communicates with an annular lubricant containing chamber 24. This chamber communicates with the inner annular chamber 26 by means of the small hole 25. In operation, to close the valve, the disk valve 18 is turned in an anti-clockwise direction, so as to bring the disk valve 18 on the annular seating 17, thereby closing hole 20. To admit lubricant to the sight feed glass, the disk valve 18 is turned in a clockwise direction, thereby allowing the lubricant to flow from the inner annular chamber through the small hole 20, thence by the cross cuts 21 through the small hole 14 to the lubricant containing chamber 13 and thence to the nozzle.

The specific examples of my invention hereinbefore described are for use with steam pressure, but it will be understood that other fluid pressure may be utilized so long as the pressure operating to discharge the lubricant is higher than the pressure at the part to be lubricated. It will be at once apparent for instance that air pressure may be utilized and in the case of locomotives fitted with Westinghouse brakes the pressure would be readily available.

What I claim and desire to secure by Letters Patent is:—

1. A lubricator comprising a cylinder, a piston operating in said cylinder, a source of fluid pressure, means for introducing said fluid pressure into a closed space behind said piston, a container for lubricant separate from said cylinder, and hydraulic connection between said cylinder and said container whereby the pressure exerted upon the piston in the cylinder is transmitted to the lubricant container to operate to discharge said lubricant to the part to be lubricated, and an outlet from the lubricant container leading to said part to be lubricated.

2. A lubricator comprising a cylinder, a piston operating in said cylinder, a source of fluid pressure, means for introducing said fluid pressure into a closed space behind said piston, a container for lubricant separate from said cylinder, hydraulic connection between said cylinder and said container whereby the pressure exerted upon the piston in the cylinder is transmitted to the lubricant container to operate to discharge said lubricant to the part to be lubricated, an outlet from the lubricant container leading to said part to be lubricated, a valve controlling said outlet and a sight glass for indicating the rate of discharge from the container to the part to be lubricated.

3. A lubricator comprising a cylinder, a piston operating in said cylinder, a source of fluid pressure, means for introducing said fluid pressure into a closed space behind said piston, a container for lubricant separate from said cylinder, hydraulic connection between said cylinder and said container whereby the pressure exerted upon the piston in the cylinder is transmitted to the lubricant container to operate to discharge said lubricant to the part to be lubricated, an outlet from the lubricant container leading to said part to be lubricated, a valve controlling said outlet, a sight glass for indicating the rate of discharge from the container to the part to be lubricated, and means for cutting said sight glass out of circuit at will.

4. A lubricator comprising a container for the lubricant, means for charging the container, means operated by fluid pressure for discharging lubricant from the container to the part to be lubricated, and a test hole closed by a plug adjacent the part to be lubricated.

5. A regulating valve for forced feed lubricators comprising in combination means forming a plurality of chambers, a delivery nozzle, one of said chambers directly communicating with said delivery nozzle, said means having restricted passages connecting said chambers one with the other and a valve member dividing one of said chambers into two parts and having a restricted passage therein, the restricted passages in said means and in said valve preventing the variation of the difference between the inlet pressure on the lubricant and the outlet pressure from causing any substantial difference in the flow of lubricant through the nozzle.

6. A lubricator discharge valve comprising in combination, a discharge nozzle, means forming a plurality of chambers one of which is in direct communication with said nozzle, said means having a restricted passageway forming an inlet to said nozzle chamber and leading out of a second one of said chambers, and a valve mounted in said second chamber and adapted to cut off the supply of liquid to said passageway and having two restricted passages therein arranged in series, said means having also a third chamber serving as an inlet chamber and a restricted passageway connecting said last mentioned chamber with said valve chamber.

7. An improved delivery valve for forced feed lubricators comprising a casing, a discharge nozzle mounted on said casing, said casing having a chamber in direct communication with the discharge nozzle and a restricted passage leading therefrom, said casing having a second chamber therein with which said passage connects, said second chamber having a flat wall through which said passage leads, means dividing said second chamber into two parts, a valve having an annular projection thereon arranged to bear against said flat wall in one position of the valve and surrounding said passage, said means having a valve seat thereon, said valve having a flanged portion adapted to contact with said seat in one position of the valve, said flanged portion and said annular projection having restricted communicating passages therein whereby fluid may pass said first mentioned passage in one position of the valve, but the passage in said flanged portion being shut off by said valve seat in the closed position of the valve, said means having a restricted passage therein connecting the two portions of said second chamber.

8. A lubricating apparatus comprising in combination a cylinder, a piston operating in said cylinder, a container for lubricant separate from said cylinder, and hydraulic connections between said cylinder and said container whereby the pressure exerted by the piston on the fluid in the cylinder is transmitted to the lubricant container to operate to discharge the lubricant to the parts to be lubricated, said hydraulic connections entering said lubricant container at the bottom thereof, and said container having an outlet for lubricant at the top thereof.

9. A lubricating apparatus comprising in combination, a container for the lubricant, means for placing said lubricant under pressure, a pipe for conducting lubricant to the part to be lubricated, a weighted valve through which lubricant discharges near the outlet end of said pipe, and means forming a test hole on the high pressure side of said valve whereby it may be determined when said pipe is filled with lubricant.

In testimony whereof I affix my signature in presence of two witnesses.

ROBERT ABSALOM THOM.

Witnesses:
 MATTHEW DALTON ROBINSON,
 JAS. STEWART BROADFOOT.

Copies of this patent may be obtained for five cents each, by addressing the "Commissioner of Patents, Washington, D. C."